(12) United States Patent
Rustad et al.

(10) Patent No.: US 10,956,329 B2
(45) Date of Patent: Mar. 23, 2021

(54) CACHE COHERENT NODE CONTROLLER FOR SCALE-UP SHARED MEMORY SYSTEMS HAVING INTERCONNECT SWITCH BETWEEN A GROUP OF CPUS AND FPGA NODE CONTROLLER

(71) Applicant: Numascale AS, Oslo (NO)

(72) Inventors: Einar Rustad, Oslo (NO); Helge Simonsen, Oslo (NO); Steffen Persvold, Oslo (NO); Goutam Debnath, Beaverton, OR (US); Thomas Moen, Oslo (NO)

(73) Assignee: Numascale AS, Oslo (NO)

( * ) Notice: Subject to any disclaimer, the term of this patent is extended or adjusted under 35 U.S.C. 154(b) by 0 days.

(21) Appl. No.: 16/610,326

(22) PCT Filed: Apr. 30, 2018

(86) PCT No.: PCT/NO2018/050115
§ 371 (c)(1),
(2) Date: Nov. 1, 2019

(87) PCT Pub. No.: WO2018/203754
PCT Pub. Date: Nov. 8, 2018

(65) Prior Publication Data
US 2020/0089612 A1 Mar. 19, 2020

(30) Foreign Application Priority Data
May 2, 2017 (NO) .................................. 20170719

(51) Int. Cl.
*G06F 12/0817* (2016.01)
*G06F 9/54* (2006.01)
(Continued)

(52) U.S. Cl.
CPC .......... *G06F 12/0828* (2013.01); *G06F 9/544* (2013.01); *G06F 12/0813* (2013.01); *G06F 13/4022* (2013.01); *G06F 15/17343* (2013.01)

(58) Field of Classification Search
CPC .. G06F 12/0828; G06F 9/544; G06F 12/0813; G06F 13/4022; G06F 15/17343
See application file for complete search history.

(56) References Cited

U.S. PATENT DOCUMENTS 6,094,686 A 7/2000 Sharma
6,115,804 A 9/2000 Carpenter et al.
(Continued)

FOREIGN PATENT DOCUMENTS

JP 201663350 A 4/2016
WO 2016144953 A1 9/2016

OTHER PUBLICATIONS

D. Teodosiu et al. "Hardware Fault Containment in Scalable Shared-Memory Multiprocessors" Computer Systems Laboratory; Jun. 2, 1997; pp. 73-84 (12 pages).
(Continued)

*Primary Examiner* — Tammara R Peyton
(74) *Attorney, Agent, or Firm* — Osha Bergman Watanabe & Burton LLP (57) ABSTRACT

The present invention relates to cache coherent node controllers for scale-up shared memory systems. In particular it is disclosed a computer system at least comprising a first group of CPU modules connected to at least one first FPGA Node Controller configured to execute transactions directly or through a first interconnect switch to at least one second FPGA Node Controller connected to a second group of CPU modules running a single instance of an operating system.

19 Claims, 7 Drawing Sheets

(51) Int. Cl.
*G06F 12/0813* (2016.01)
*G06F 13/40* (2006.01)
*G06F 15/173* (2006.01)

(56) References Cited

U.S. PATENT DOCUMENTS

| | | |
|---|---|---|
| 6,789,173 B1 | 9/2004 | Tanaka et al. |
| 7,315,919 B1 | 1/2008 | O'Krafka et al. |
| 7,406,086 B2 | 7/2008 | Deneroff et al. |
| 8,706,966 B1 | 4/2014 | Kraipak et al. |
| 10,732,879 B2* | 8/2020 | Niell .................. H04L 12/2881 |
| 2010/0271071 A1 | 10/2010 | Bartley et al. |
| 2014/0052923 A1 | 2/2014 | Ikeda |
| 2015/0067269 A1 | 3/2015 | Wang et al. |
| 2016/0034398 A1 | 2/2016 | Wendel et al. |
| 2016/0147658 A1 | 5/2016 | Ambroladze et al. |
| 2020/0045111 A1* | 2/2020 | Kannan ................. G06F 3/0611 |
| 2020/0050547 A1* | 2/2020 | Rustad ................. G06F 15/8023 |

OTHER PUBLICATIONS

J. Kim et al. "Technology-Driven, Highly-Scalable Dragonfly Topology" International Symposium on Computer Architecture; Jun. 21, 2008; pp. 77-88 (12 pages).
International Search Report issued in Application No. PCT/NO2018/050115, dated Aug. 6, 2018 (5 pages).
Written Opinion issued in Application No. PCT/NO2018/050115, dated Aug. 6, 2018 (7 pages).
Norwegian Search Report issued in Norwegian Application No. 20170719, dated Oct. 25, 2017 (2 pages).

* cited by examiner

Fig. 9
2D and 3D Torus Topology Options

Ex: 8 x 8 x8 = 512 Nodes –> 1024 Sockets

Fig. 10

CACHE COHERENT NODE CONTROLLER FOR SCALE-UP SHARED MEMORY SYSTEMS HAVING INTERCONNECT SWITCH BETWEEN A GROUP OF CPUS AND FPGA NODE CONTROLLER

TECHNICAL FIELD

The present invention relates to a multiprocessor memory sharing systems including node controllers. In a scalable shared memory system with multiple general purpose central processing units the present invention uses transaction engines to perform actions required to maintain system wide cache and memory coherency.

BACKGROUND ART

The introduction of Field Programmable Gate Arrays (FPGAs) has opened opportunities to use such circuits in a plurality of ways as components in computing systems. The present invention combines the FPGA capabilities with a specific type of functionality. The functionality can be described as a Node Controller in a scalable computer system with multiple central processing units (CPUs) where all the processors can share and operate on all the available memory and where all the caches and the corresponding memory locations in the system are kept coherent with respect to the valid data produced by the processors.

Modern processors have capabilities of interconnecting a relatively low number of processor modules to form larger systems by direct connections between the processors across point-to-point links. Each processor module contains a number of CPU cores. These links are not capable of expanding the system size beyond typically 4-8 modules, although some may go as far as a maximum of 16. For performance reasons, the directly connected systems are limited to 8 modules due to the increasing inefficiency in the protocols that handle the housekeeping task to maintain data coherency across all memories and high speed caches in the system.

By cache coherence, it is meant consistency of shared data stored in multiple local caches. In a multi-processor system with multiple local caches, data that reside in these caches must be updated or invalidated such that accesses to the data will reflect the latest values stored by any given processor with access to that data. Processors operate independently of each other and thereby influence on the caches independently of each other and without cache coherence logic, shared data would not be valid and would cause inconsistent results for multithreaded programs that use the data.

Cache coherence is intended to manage and maintain consistency between the caches and memory.

Multiprocessor memory sharing systems has normally been carried out with hard-wired application specific integrated circuits (ASICs) using state machines that cannot be changed after the ASIC has been manufactured. This requires a very comprehensive verification program to be conducted before the ASIC is produced and leaves no room for correcting any potential errors in the state machines without making a new ASIC. This is both expensive and time consuming.

U.S. Pat. No. 7,406,086 B2 discloses a method and apparatus for parallel processing. One embodiment provides a multiprocessor computer system that includes a first and second node controller, a number of processors being connected to each node controllers, a memory connected to each controller, a first input/output system connected to the first node controller, and a communications network connected between the node controllers.

DISCLOSURE OF INVENTION

It is one object of the invention to provide a flexible Node Controller for multiple processor systems with memory sharing, which do not suffer from the problems indicated above, in particular the problems related to the tedious verification and testing necessary for node controllers in multi-processor systems. This and other objects are met by a computer system at least comprising a first group of CPU modules connected to at least one first FPGA, Field-programmable gate array Node Controller being configured to execute transactions directly or through a first interconnect switch to at least one second FPGA Node Controller connected to a second group of CPU modules running a single instance of an operating system. According to one aspect of the invention the system comprises an FPGA Node Controller routing mechanism to perform direct and indirect connection to other FPGA Node Controllers within the system. The routing mechanism can be an FPGA Node Controller internal programmable crossbar switch.

In one aspect of the invention, the FPGA Node Controllers can be connected in a torus topology, and in another aspect of the invention the FPGA Node Controllers can be connected in a Dragonfly topology.

In one aspect the FPGA Node Controllers are interconnected through an Ethernet switch, in another aspect the FPGA Node Controllers are interconnected through an Omnipath switch and in yet another aspect of the invention the FPGA Node Controllers are interconnected through an InfiniBand switch.

In yet another aspect of the invention the at least one first FPGA Node Controllers are connected to separate first memory modules, where the first memory modules contain information about the state of memory and cache locations.

In one aspect of the invention the at least one first FPGA Node Controller can be connected to separate first memory modules on a first side of the first interconnect switch to store cache lines that belong to a second memory in a second node on a second side of the first interconnect switch. In one aspect of the invention, the FPGA Node Controllers can utilize internal RAM to implement a partial sectored directory with a minimal memory line tag information to speed up necessary tag lookup.

In another aspect of the invention, the FPGA Node Controller may contain multiple instances of a protocol transaction processing engine that perform the necessary transactions on directories and tags to maintain the system with cache and memory coherency.

In yet an aspect of the invention the at least one first FPGA Node Controller can be configured to issue speculative cache line requests to a target responder before the state of the cache line is known to the at least one first FPGA Node Controller and where a transaction can be dropped if the cache line is valid at the requester, where the target responder can be a second node on a second side of the first interconnect switch.

In another aspect of the invention the at least first FPGA Node Controllers are co-located with associated CPU chips in a multi-chip package.

According to a second embodiment of the invention, it is provided a Node Controller for multiprocessor memory sharing systems, where the Node Controller is an FPGA Node Controller with a local Node controller cache memory.

Other advantageous features will be apparent from the accompanying claims.

BRIEF DESCRIPTION OF DRAWINGS

Following is a brief description of the drawings in order to make the invention more readily understandable, the discussion that follows will refer to the accompanying drawings, in which.

DETAILED DESCRIPTION OF THE INVENTION

In the following it is firstly disclosed general embodiments in accordance to the present invention, thereafter particular exemplary embodiments will be described. Where possible reference will be made to the accompanying drawings and where possible using reference numerals in the drawings. It shall be noted however that the drawings are exemplary embodiments only and other features and embodiments may well be within the scope of the invention as described. The present invention combines the FPGA capabilities with a specific type of functionality. The functionality can be described as a Node Controller in a scalable computer system with multiple central processing units (CPUs) where all the processors can share and operate on all the available memory and where all the caches and the corresponding memory locations in the system are kept coherent with respect to the valid data produced by the processors.

The invention is based on using an FPGA in close proximity to a CPU with respect to connectivity. The FPGA is connected to the inter-processor communication link of a processor such as the HyperTransport™ for AMD, QPI™ and UPI™ from Intel, CCPI™ from Cavium, NVLink™ from Nvidia or CAPI™ from IBM. Through this type of connection, the FPGA Node Controller (FNC) will act as an interface for multiple CPU modules to be connected to form scalable multiprocessor systems.

According to one aspect of the invention a Node Controller (NC) is connected to a server processor's coherent interface. The Node Controller manages information packets generated by CPUs and transferred by the coherent interface to the Node Controller to perform memory transactions in the form of read/write operations and other special transactions that are used to send management signals between the different memory and cache units in a computer system in order to keep the data contained in the memory and cache units coherent, i.e. any given entity in the memory system should reflect the latest update done by any processor in the system. Multiple such Node Controllers can be connected to each other across an interconnect fabric and set up to form a unified shared memory computer system.

Modern CPUs are equipped with coherent links to connect a small number, of CPUs into a larger shared memory system—a "Node". Larger systems will have to be built using special circuitry to connect "Nodes" together to form a larger shared memory system consisting of a number of such Nodes. A Node can typically contain from 1 to 4 CPUs and one or more Node Controllers.

According to the present invention the Node Controller is programmable at the time when the system is booted. This programmability enables correcting initial design errors in addition to allow for field upgrades and optimizations done at a later stage. FPGA-programming can be executed by the use of programmable flash memories. The flash-memories might be accessed by traditional input devices such as from computers. It also reduces the risk of not having a workable product with the first version of the Node Controller since design flaws can be corrected. The present invention combines an FPGA Node Controller capability with a specific type of functionality.

The present invention will now be described in detail with support from the drawings.

First Embodiment of a FPGA-Node Controller

Figure 1A:
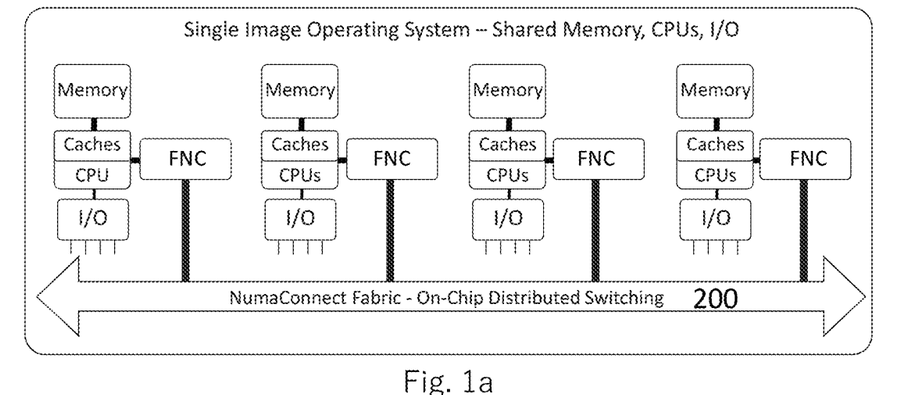
FIG. 1a shows an example of system architecture without node controller caches.

FIG. 1a shows a system architecture according to a first embodiment comprising four exits from the node controllers, indicated as FNC in the figure, to an on-chip distributed switching 200. Each node comprises at least one CPU where the at least one CPU includes one or more local caches. In the second embodiment of the FPGA-node controller the node controllers according to the first embodiment is not associated with node controller caches. Whether to include such caches or not is a trade-off, where among others designers have to take into consideration the character of the data traffic. Caches associated with the FPGA-controllers is of little use and will reduce the overall performance if the data traffic pattern does not have a "repeatable" character, i.e. if data in the cache is not reused. In such situations including caches in the system only causes extra traffic. The character of the traffic is dependent of the tasks to be carried out. Data base inquiries can be random and reuse of data is not likely to happen, hence a local cache is not of any use, in contrast software programs running repeatable routines might reuse data and hence a local cache associated with an FPGA-node controller can be favourable. The second embodiment of an FPGA-controller includes local caches associated with the FPGA's.

The at least one CPU of each node is also connected to an FPGA node controller. The node controller of a first node is interconnected with a second, a third and a fourth node. The interconnection can be carried out using different types of fabric connections 200 such as cross bar switches or any other suitable switch. In some aspects of the invention the interconnection 200 can be through Ethernet, Omnipath or Infiniband switches.

The switching fabric can be 1D, 2D and 3D (Torus) this is not shown in the drawings and it will be explained below with reference to another figure. The node controllers provide cache coherency and memory coherency within the system in FIG. 1a. Obviously, the system shown in FIG. 1a can be extended both with respect of the number of nodes and with respect to the components within each single node.

Figure 2A:
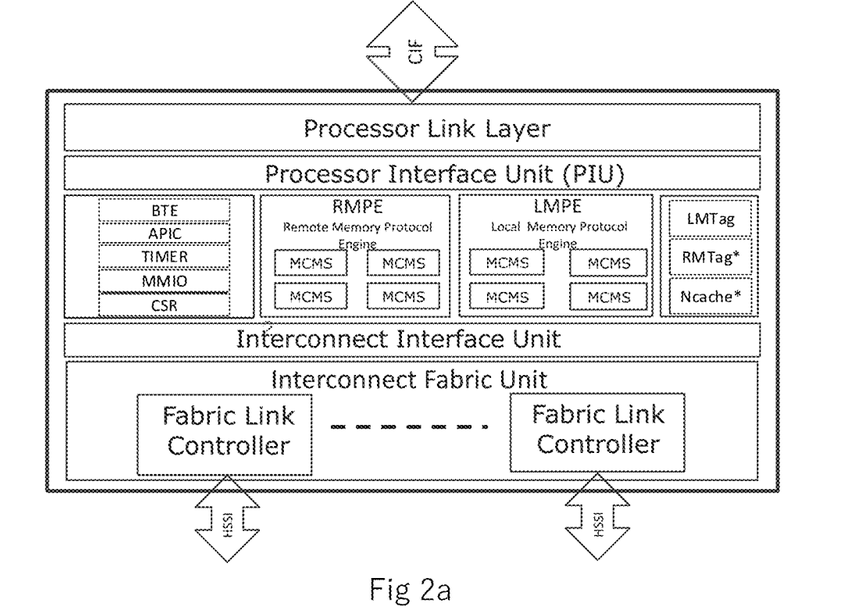
FIG. 2a shows a block diagram of an FPGA node controller comprising an optional cache memory.

FIG. 2a shows a block diagram of an FPGA-node controller. The node controller is provided with interfaces for communication with CPU's, memories, other node controllers etc. At the top of the figure one CIF, bidirectional Coherent Interface is shown. The CIF connects the node controller with one or more CPU's within the same node. The at least one CIF communicates with the FPGA-node controller through an on-chip "Processor Link Layer". The routing layer is CPU-specific, and can be changed in the FPGA since the FPGA is fully programmable. Each CPU type will require a specific PHY layer since the CIF is proprietary to each CPU vendor. The routing layer can also be programmed to tunnel transactions between two CIFs in the case of dual or multiple CIF connections to the FPGA. A processor Interface Unit is also embedded in the FPGA-node controller, the processor interface Unit translates the transactions specific to the particular CPU architecture into a global cache coherence protocol and transfers the transactions to cache coherence protocol engines. Communication with remote and local memories and caches requires that the requester, the FPGA-node controller in question, speaks the same language as the receivers. Hence both a local Memory Protocol Engine LMPE and a Remote Memory Protocol Engine, RMPE, is included in the FPGA-node controller. The LMPE and RMPE sets up the correct protocols to match data transfer between memories within a node as well as between nodes. Apart from the Processor Link Layer the FPGA-node controller can be configured for different CPUs by flash memory programming. The node controller includes on-chip fabrics shown as an "Interconnect Fabric Unit". The Interconnect Fabric Unit links the node controller to other nodes in a system of nodes. The interface between the node controller and remote nodes is shown as two HSSI-gates. The on chip switch routes traffic from the node controller to the fabric link controllers and further to the HSSI-gates.

The width of the interconnect fabric ports can be flexibly configured to accommodate a number of ports that is the multiple of the number of lanes per port and the number of ports. I.e. if there are 16 lanes available for the fabric ports, these can be configured as 16 separate ports, 4 times 4-lane ports, two 8-lane ports, etc.

Figure 2B:
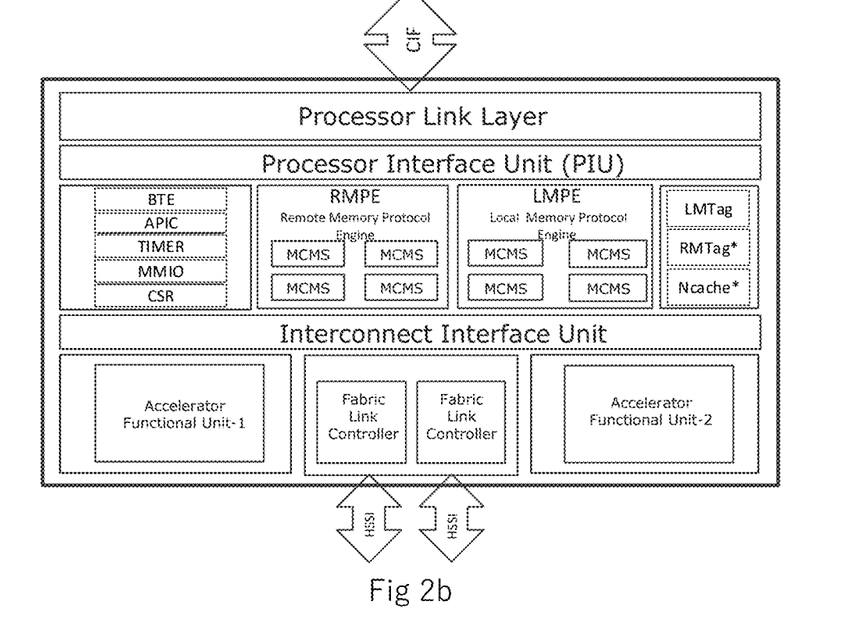
FIG. 2b shows another block diagram of an FPGA node controller comprising an optional cache memory.
Figure 2C:
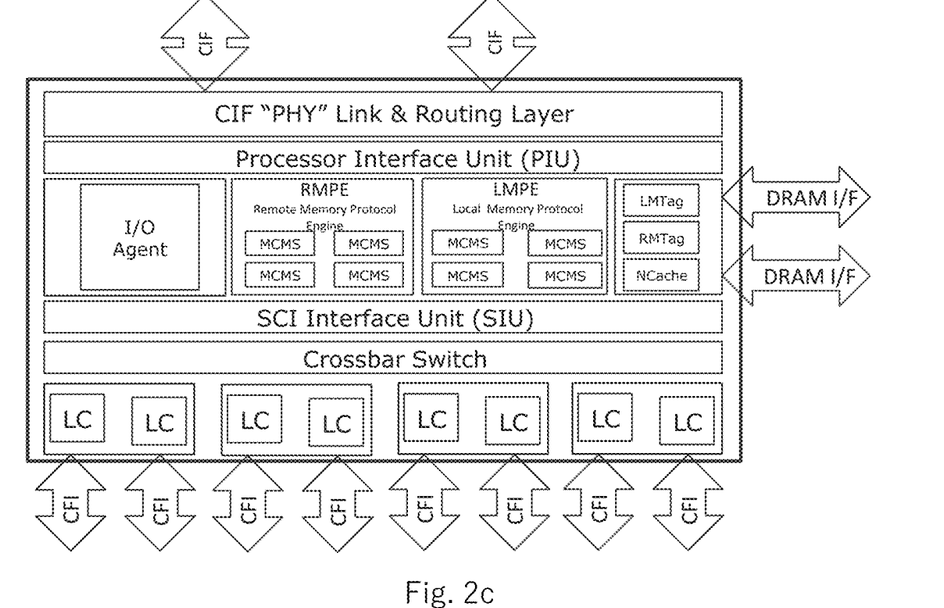
FIG. 2c shows another block diagram of an FPGA node controller.

Three boxes are indicated next to the LMPE, namely LMTag, RMTag and NCache. All of them are optional, and any one of them can me omitted. Moreover it is not mandatory to include all of, or any of, the elements BTE, APIC and TIMER. In FIGS. 2a, 2b and 2c this is indicated by showing the "boxes" with dotted lines. An on-chip NCache acting as a "victim" cache can be efficient for many workloads even if it is very small, hence it may be included on-chip. An on-chip NCache does not have the same drawback as an off-chip cache with regards to bandwidth and latency considerations. The second embodiment specifies that the NCache is mandatory. A separate drawing which excludes the NCache has not been provided for illustration of the first embodiment of the FPGA-node controller. The NCache will be described further with respect to the second embodiment of the FPGA-node controller.

LMPE is the Local Memory Protocol Engine. The LMPE is an engine specifically designed to handle memory transactions through executing microcode firmware. The firmware is specific to the particular processor architecture's cache coherence protocol. It handles all memory transactions that are directed from an external processor to the memory connected to the processors local to the Node Controller.

RMPE is the Remote Memory Protocol Engine. The RMPE handles the memory transactions that are destined to operate on memory connected with processors that are located on the other side of the Coherent Interface Fabric. The RMPE is also controlled by microcode firmware and programmed to be compliant with the cache coherence protocol of the particular processor architecture.

MCMS is the Multi Context Micro Sequencer and can be present as a number of separate instances depending on the amount of outstanding memory transactions that is necessary to satisfy the performance requirements for a particular implementation. The MCMS handles the sequencing of the microinstructions in the microcode firmware. LMTag is the Local Memory directory tag. The LMTag encodes the state of the memory lines of the processors local to the Node Controller. The memory lines are equal in size to the granularity for the particular processor architecture. Most modern processor architectures use 64 bytes as the granularity of the objects that are contained in the processor cache memories.

RMTag is the Remote Memory directory Tag.

FIG. 2b shows a block diagram of an FPGA-node controller. The block diagram resembles that of FIG. 2a except for the addition of Accelerator Functional Unit-1 and the Accelerator Functional Unit-2. The FIG. 2b indicates two additional Accelerator Functional Units, however it is a matter of design and one, two or more Accelerator Functional Units can be added. The Accelerator Functional Units can be used to relieve the CPU from tasks and/or to carry out tasks such as inspection of data, search for particular bit patterns and carry out special functions. The functions can be tailored according to wish as they are programmable. The Accelerator Functional Units can be arranged so that all data routed through the Fabric Link Controllers with a HSSI-protocol are routed through the Accelerator Functional Units or the Accelerator Functional Units can sniff data to and from the Fabric Link Controllers. The Accelerator Functional Units can also be activated by control register signalling, hence activated based on need. Feedback from the Accelerator Functional Units to an associated CPU can be an interrupt to the CPU hence keeping the CPU undisturbed until request is received at the CPU.

Second Embodiment of an FPGA-Node Controller

Figure 1B:
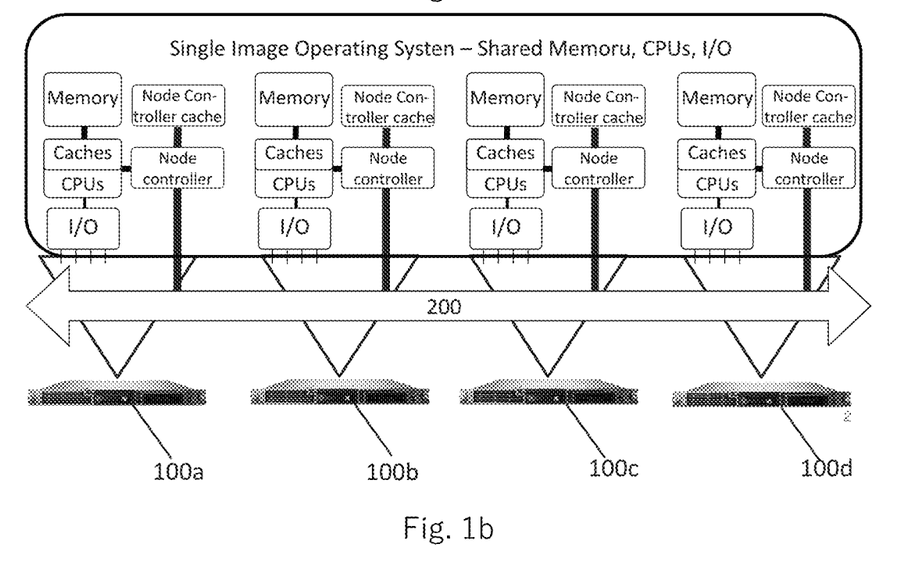
FIG. 1b shows an example of system architecture with node controller caches.

FIG. 1b shows a system architecture comprising four devices 100a, 100b, 100c, 100d, each device being a computer, a server or a blade server—above referred to as a node 100a, 100b, 100c, 100d. Each node 100a, 100b, 100c, 100d comprises at least one CPU where the at least one CPU includes or are associated with one or more local caches. The local caches are further connected to the local CPU memory. The at least one CPU of each node is also connected to a Node controller. Each node controller is provided with or associated with its own node controller cache. The node controller of a first node 100a is interconnected with the node controllers of a second 100b, a third 100c and a fourth 100d node. The interconnection can be carried out using different types of fabric connections 200 such as cross bar switches or any other suitable switch. In some aspects of the invention the interconnection 200 can be switching over Ethernet, Omnipath or Infiniband.

The switching fabric can be 1D, 2D and 3D (Torus) this is not shown in the drawings and it will be explained below with reference to another figure. The node controllers provide cache coherency and memory coherency within the system in FIG. 1b. Obviously, the system shown in FIG. 1b can be extended both with respect of the number of nodes and with respect to the components within each single node 100a, 100b, 100c, 100d.

FIG. 2c shows a block diagram of an FPGA-node controller. The node controller is provided with interfaces for communication with CPU's, memories, other node controllers etc. At the top of the figure two CIF, bidirectional Coherent Interfaces are shown. The CIF connects the node controller with one or more CPU's within the same node. The at least one CIF communicates with the FPGA-node controller through an on-chip "Coherent Interface "PHY" Link & Routing Layer". A processor Interface Unit is also embedded in the FPGA-node controller, the processor interface Unit translates the transactions specific to the particular CPU architecture into a global cache coherence protocol and transfers the transactions to cache coherence protocol engines. Communication with remote and local memories and caches requires that the requester, the FPGA-node controller in question, speaks the same language as the receivers. Hence both a local Memory Protocol Engine LMPE and a Remote Memory Protocol Engine, RMPE, is included in the FPGA-node controller. The LMPE and RMPE sets up the correct protocols to match data transfer between memories within a node as well as between nodes. Apart from the Routing layer (Coherent Interface "PHY" Link & Routing Layer) the FPGA-node controller can be configured for different CPUs by firmware downloading. The node controller includes on-chip fabrics shown as a crossbar switch. The crossbar switch links the node controller to other nodes in a system of nodes. The interface between the node controller and remote nodes is shown as eight Coherent Fabric Links (CFL) gates. The on chip crossbar switch routes traffic from the node controller to the correct CFL gate and further to the correct memory/cache. Link controllers, LC, are provided in between the CFL gates and the crossbar switch.

DRAM IF is shown as two bidirectional links on the right side of the block diagram of FIG. 2c. There is one or more optional DRAM IF providing interface between the FPGA-node controller and its associated node controller directory tag and/or cache. In the case of using the optional DRAM, three boxes are indicated next to the DRAM IF gates, namely LMTag, RMTag and NCache. The NCache is an on-chip cache for caching remote data to be used by local processors. This cache keeps the most recently used data residing in the off-chip cache located in one of the external DRAM modules. The NCache in FIG. 2c corresponds with the Node Controller Cache shown in FIG. 1b.

The FPGA-node controller further includes an I/O Agent visualised as a box to the left in FIG. 2c. The I/O agent handles input and output of non-coherent memory transactions issued by the processors and other housekeeping tasks for accessing control registers and status registers that can be operated upon by the operating system or a separate system maintenance processor. The status registers keep information from error counters and error correcting circuits that are included to provide data consistency in case of soft errors in data-paths, interconnect fabric links and processor links.

LMPE is the Local Memory Protocol Engine. The LMPE is a programmable engine specifically designed to handle memory transactions through executing microcode firmware. The firmware is specific to the particular processor architecture's cache coherence protocol. It handles all memory transactions that are directed from an external processor to the memory connected to the processors local to the Node Controller.

RMPE is the Remote Memory Protocol Engine. The RMPE handles the memory transactions that are destined to operate on memory connected with processors that are located on the other side of the Coherent Interface Fabric. The RMPE is also controlled by microcode firmware and programmed to be compliant with the cache coherence protocol of the particular processor architecture.

MCMS is the Multi Context Micro Sequencer and can be present as a number of separate instances depending on the amount of outstanding memory transactions that is necessary to satisfy the performance requirements for a particular implementation. The MCMS handles the sequencing of the microinstructions in the microcode firmware.

LMTag is the Local Memory directory tag. The LMTag encodes the state of the memory lines of the processors local to the Node Controller. The memory lines are equal in size to the granularity for the particular processor architecture. Most modern processor architectures use 64 bytes as the granularity of the objects that are contained in the processor cache memories.

RMTag is the Remote Memory directory Tag, The RMTag encodes the state of the cache lines contained in the NCache and also contains pointers is some form to identify the address of the Node Controller on the remote node where the corresponding memory addresses are located.

NCache is the NumaCache. The NCache holds the most recently used memory lines from the processors associated with the remote Node Controllers.

Figure 3:
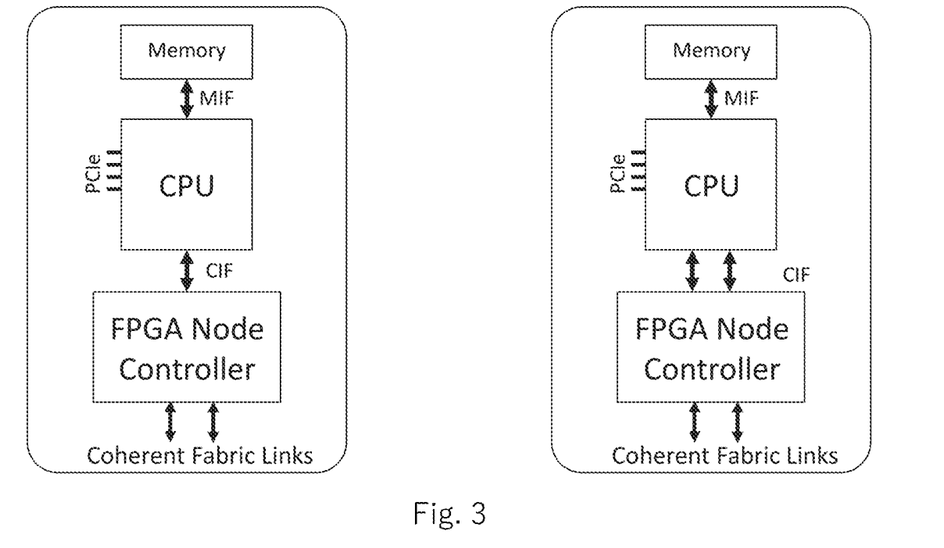
FIG. 3 shows two first examples of FPGA Node Controllers in communication with CPUs and coherent fabric links.
Figure 4:
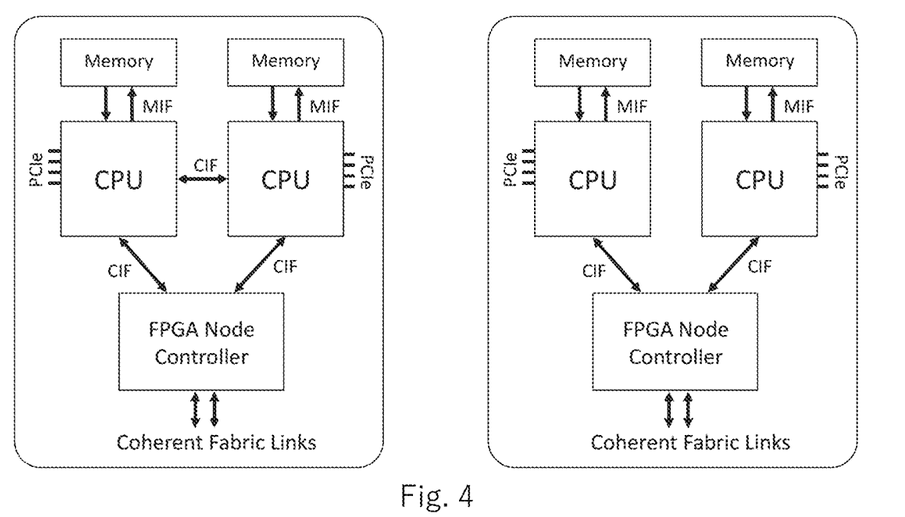
FIG. 4 shows two second examples of FPGA Node Controllers in communication with CPUs and coherent fabric links.

The FPGA-node-controller with two different node options are shown in FIG. 3 and FIG. 4, the first option in FIG. 3 and the second in FIG. 4. FIG. 3 shows two simplified nodes each node includes at least one CPU, one FPGA-node-controller, and one Memory associated with the CPU. Details are not included and the FPGA-node-controller can in accordance with the second embodiment include its own cache-memory. From the FPGA-node-controller it is shown eight Coherent Fabric Links (CFL). These coherent fabric links corresponds with the CFL described with reference to FIG. 2c. The interface between the FPGA-node-controller and the CPU is shown as one coherent interface, CIF, on the left side and two coherent interfaces on the right node in FIG. 3. Peripheral Interconnect Express, PCIe, is shown as the interface between the CPU's and components outside of the node. Other bus standards for connecting peripherals might be used. A dedicated memory interface is provided between the CPU and the local memory within the node. The difference between the right hand side node and the left hand side node of FIG. 3 is as mentioned that the right hand side is provided with two coherent interfaces between the CPU and the FPGA-node-controller.

FIG. 4 shows the second node option the second option is a scaled up version of the first option, as this second option shows nodes with two CPU's each. This is shown as an example as the system according to the present invention scales well and the number of CPU's can far exceed two. It can be seen that a single FPGA-node controller handles two CPU's over a bidirectional coherent interface link. The same applies between the two CPU's, whilst the interface between the individual CPU's associated memory is provided as two bidirectional memory interfaces. As for FIG. 4 the interface between the CPU's and external components is exemplified as Peripheral Component Interconnect-express as was also the case in FIG. 3.

Figure 5:
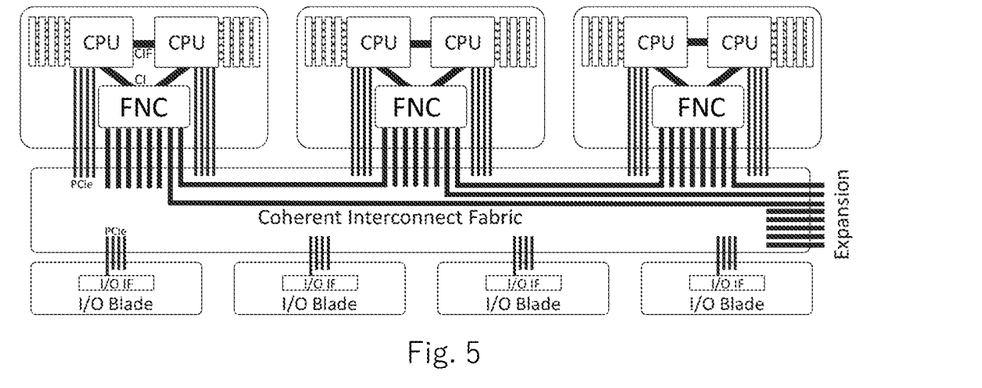
FIG. 5 shows a system example including Node Controllers, CPU's and I/O peripherals.

FIG. 5 shows an example of three nodes in a system, however many more nodes can be included in a system according to the present invention. In this example each node is provided with two CPU's which correspond to the configuration shown in FIG. 4. Each node is connected directly to 7 other nodes through printed circuit board backplanes or cables, hence the FPGA-node-controller in one node can communicate over a coherent fabric link, CFL, with a FPGA-node-controller in any neighbouring node of the system. The system example of FIG. 5 indicates a system, which can include 8 blades plus expansion ports to connect to same expansion ports in other crates to expand the system size. The eight blades correspond with seven coherent fabric links indicated for each FPGA-node-controller. Each FPGA-node-controller within each node is connected with two CPU's over a coherent interface. It can be seen that the CPUs are interconnected over a coherent interface; also, the CPU's are connected with peripherals over PCIe as was also the case in FIGS. 3 and 4.

Network Topologies

Figure 6:
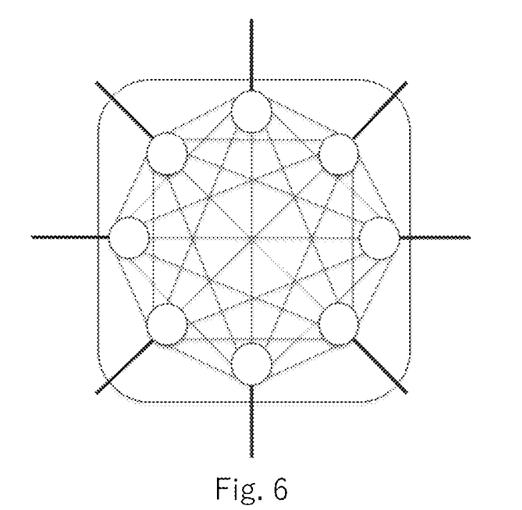
FIG. 6 shows a single chassis blade system comprising eight nodes fully interconnected in a one-hop configuration.

FIG. 6 shows a single chassis system comprising eight nodes fully interconnected in a one-hop configuration. As can be seen all nodes can access each other without any intermediate hops. The nodes are visualised as circles which are interconnected with "solid" lines.

Figure 7:
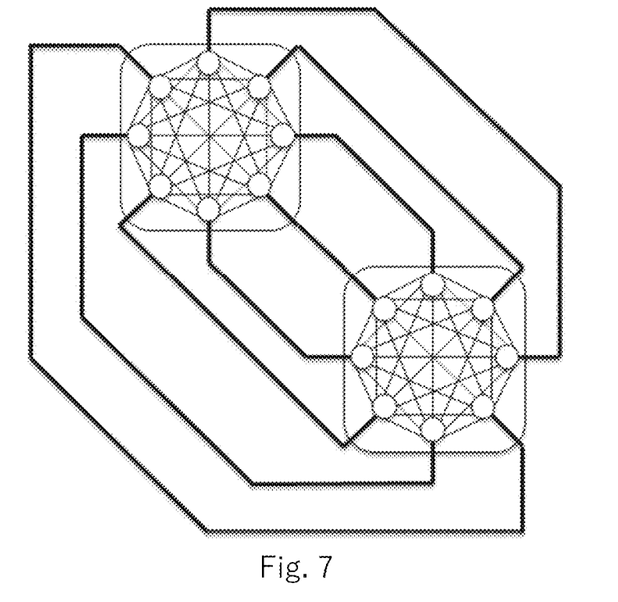
FIG. 7 shows a dual chassis blade system comprising 16 nodes in a Dragonfly topology with redundant paths.

FIG. 7 shows a dual chassis system comprising 16 nodes in a Dragonfly topology with redundant paths. This topology doubles the capacity of the single chassis system in FIG. 6 at the price of introducing one intermediate hop for some connections between nodes.

Figure 8:
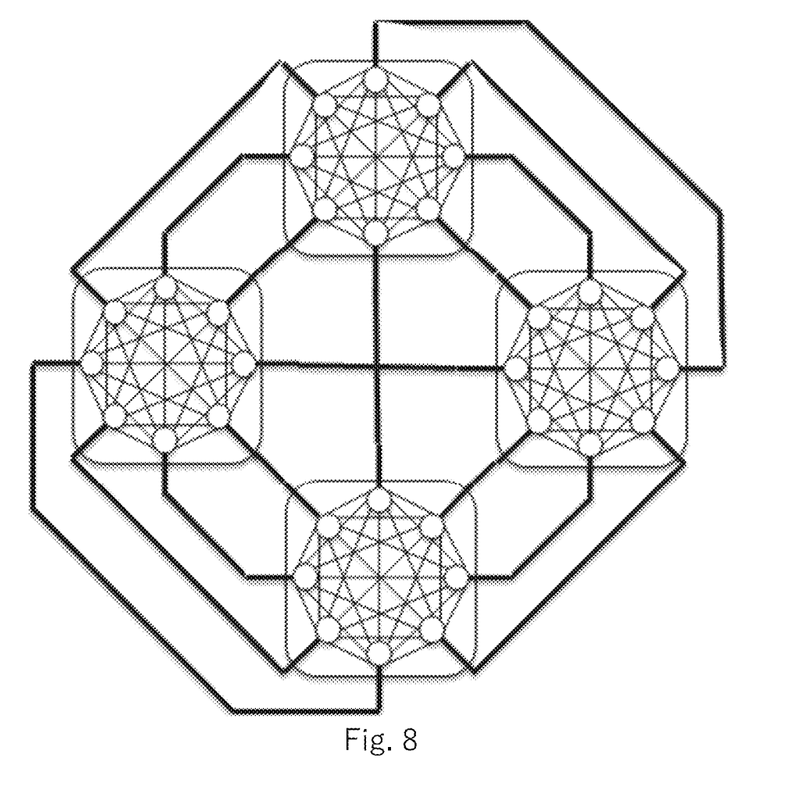
FIG. 8 shows a quad chassis blade system comprising 32 nodes in a Dragonfly topology with redundant paths.

FIG. 8 shows a quad chassis system comprising 32 nodes in a Dragonfly topology with redundant paths. This topology doubles the capacity i.e. the number of nodes compared with the dual chassis blade system. The prize to pay for doubling the capacity is that a maximum of two intermediate hops are introduced, obviously introducing more hops introduces delays in the system Still the topology is a good trade-off between capacity and delays.

Figure 9:
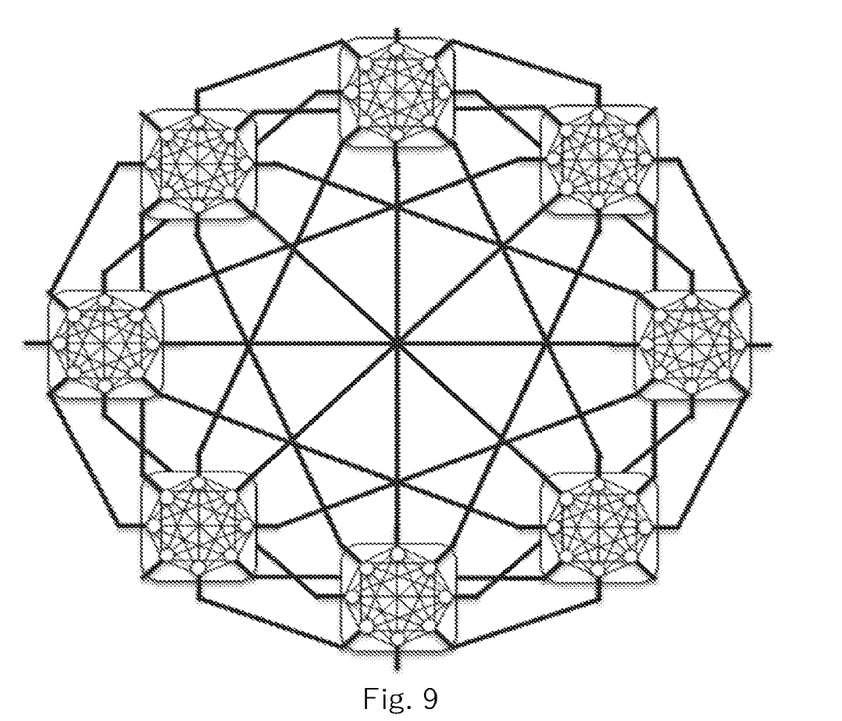
FIG. 9 shows an eight chassis blade system comprising 64 nodes in a Dragonfly topology with redundant paths.

Finally, in FIG. 9 it is disclosed an eight chassis system comprising 64 nodes in a Dragonfly topology with redundant paths.

Dragonfly topologies introduce redundant paths, which is an advantage for reliability and congestion scenarios.

The table routed on-chip crossbar used in the present description allows for a multitude of different topologies in addition to the previously described direct connected and dragonfly topologies without the use of external switching. The most relevant additional topologies to use are 1D, 2D and 3D Torus topologies. A one dimensional system means that nodes are interconnected along one single path (ring), whilst two dimensional switching means that nodes can be interconnected in a matrix. Travelling path from nodes at the top of the matrix to the bottom of the matrix then involves several hops. If this matrix is "folded together" such that the "lowermost" nodes becomes the neighbours of the "uppermost" nodes the number of hops is reduced, in fact in the described situation no hop will be necessary. This configuration can be visualised as a "tube". This solution however does not solve the problems regarding paths in the direction normal to the path from "upper to lower" nodes. By bending the "tube" into a "donut" the number of hops in all directions will statistically be fewer.

Figure 10:
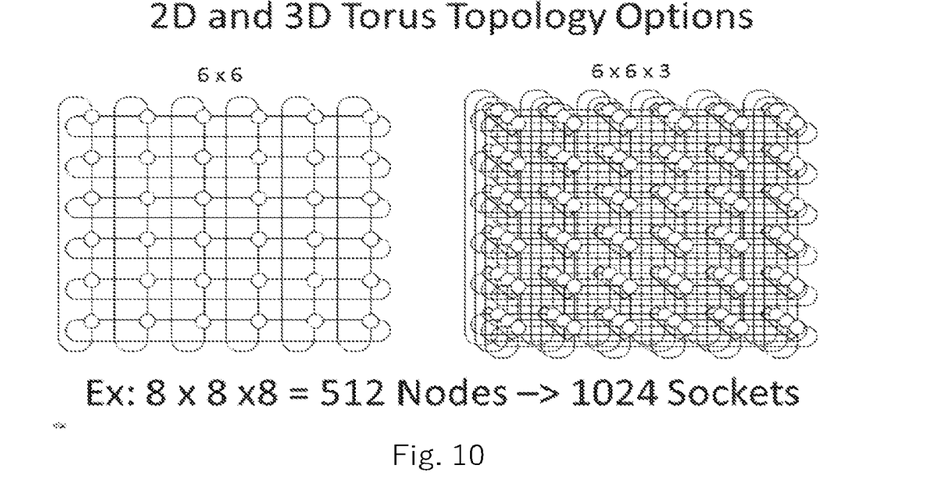
FIG. 10 shows a 2D Torus topology on the left hand and a 3D Torus topology on the right hand side.

FIG. 10 shows schematic examples of a matrix topology with 6×6 nodes to the left. The topology resembles a "double folded matrix" as the bottom and top nodes are interconnected this alone resembles the tube example above, additionally the left most nodes are connected with the right most nodes making a "double folded matrix or a donut. The figure to the right shows a 3D expanded version of the left matrix, with three layers interconnected resulting in a 6×6×3 network. Such a 3D topology scales well and an 8×8×8 network topology is indicated by text at the bottom of FIG. 16, such a topology would result in 512 nodes and altogether 1024 CPU sockets with 2 CPU sockets per node.

| | |
|---|---|
| 100a, 100b, 100c, 100d | A computer, a server or a blade server - above referred to as a node |
| 200 | On-chip distributed switching, such as but not limited to. Ethernet switch, Omnipath switch and Infiniband switch, |
| CFL | Coherent Fabric Link |
| CIF | Coherent Interface |
| CSR | Control Space Registers |
| FPGA | Field Programmable Gate Array |
| FNC | Field Programmable Gate Array Node Controller |
| HT | Hyper Transport |
| HSSI | High Speed Serial Interface. |
| LC | Link Controller |
| LM-Tag | Local Memory Tag |
| LMPE | Local Memory Protocol Engine |
| MCMS | Multi Context Micro Sequencer |
| MIF | Memory Interface |
| MMIO | Memory Mapped IO |
| NC | Node Controller |
| NCache | NumaCache (Non-uniform memory access Cache) |
| NUMA | Non-uniform memory access |
| PCI-e | PCI Express (Peripheral Component Interconnect Express |
| RM-Tag | Remote Memory Tag |
| RMPE | Remote Memory Protocol Engine |
| SCI | Scalable Coherent Interface |
| UPI | Ultra Path Interconnect |

The invention claimed is:

1. A multiprocessor memory sharing system at least comprising two or more nodes, a first node, a second node and optionally an interconnect switch, each node comprises a group of CPU's and an FPGA Node Controller, the first node comprises a first group of CPU's and at one first FPGA Node Controller configured to execute transactions directly or through the optional interconnect switch to at least one second FPGA Node Controller connected to a second group of CPU's running a single instance of an operating system, where at least one of the FPGA Node Controllers at least comprises: a) at least one Coherent Interface configured to connect the FPGA Node Controller to one or more CPU's within the same node; b) a CPU interface unit configured to translate transactions specific to a particular CPU architecture into a global cache coherence protocol; c) a remote memory protocol engine, RMPE, configured to handle memory transactions that are destined to operate on memory connected with CPU's that are located on another side of a Coherent Interface Fabric, the RMPE is controlled by microcode firmware and programmed to be compliant with the cache coherence protocol of the particular CPU architecture; d) a local memory protocol engine, LMPE, specifically designed to handle memory transactions through executing microcode firmware and it is configured to handle all memory transactions that are directed from an external CPU to the memory connected to the CPU's local to the Node Controller; and e) an interconnect fabric Unit, configured to link the FPGA Node Controllers to other nodes in the multiprocessor memory sharing system of nodes.

2. A multiprocessor memory sharing system according to claim 1, where at least one of the FPGA Node Controllers further comprises two HSSI-gates as interface between the node controller and remote nodes.

3. A multiprocessor memory sharing system according to claim 1 where the at least one first FPGA Node Controller includes at least one Fabric Link Controller.

4. A multiprocessor memory sharing system according to claim 3 where the at least one Fabric Link Controller includes interconnect fabric ports.

5. A multiprocessor memory sharing system according to claim 4 where the width of the interconnect fabric ports can be flexibly configured to accommodate a number of ports that is the multiple of a number of lanes per port.

6. A multiprocessor memory sharing system according to claim 5 where the fabric ports includes one of:
   16 lanes configured as 16 separate ports,
   16 lanes configured as two eight-lane ports
   16 lanes configured as four four-lane ports; and
   16 lanes configured as eight two-lane ports.

7. A multiprocessor memory sharing system according to claim 1 where the at least one first FPGA Node Controller is connected to at least one second FPGA Node Controller in a torus topology.

8. A multiprocessor memory sharing system according to claim 1 where the at least one first FPGA Node Controller is connected to at least one second FPGA Node Controller in a Dragonfly topology.

9. A multiprocessor memory sharing system according to claim 1 where the FPGA Node Controllers are interconnected through an Ethernet switch.

10. A multiprocessor memory sharing system according to claim 1 where the FPGA Node Controllers are interconnected through an Omnipath™ switch.

11. A multiprocessor memory sharing system according to claim 1 where the FPGA Node Controllers are interconnected through an InfiniB and switch.

12. A multiprocessor memory sharing system according to claim 1 where the at least one first FPGA Node Controller is connected to separate first memory modules, where the first memory modules contain information about the state of memory and cache locations.

13. A multiprocessor memory sharing system according to claim 1 where the at least one first FPGA Node Controller is connected to separate first memory modules on a first side of the first interconnect switch to store cache lines that belong to a second memory in a second node on a second side of the first interconnect switch.

14. A multiprocessor memory sharing system according to claim 1 where the FPGA Node Controllers utilizes internal RAM to implement a partial sectored directory with a minimal memory line tag information to speed up necessary tag lookup.

15. A multiprocessor memory sharing system according to claim 1 where the FPGA Node Controllers contains multiple instances of a protocol transaction processing engines that perform the necessary transactions on directories and tags to maintain the system with cache and memory coherency.

16. A multiprocessor memory sharing system according to claim 1 where the at least one first FPGA Node Controller is configured to issue speculative cache line requests to a target responder before the state of the cache line is known to the at least one first FPGA Node Controller and where a transaction can be dropped if the cache line is valid at the requester.

17. A multiprocessor memory sharing system according to claim 16, where the target responder is a second node on a second side of the first interconnect change.

18. A multiprocessor memory sharing system according to claim 1, where the at least one first FPGA Node Controller comprises at least one Accelerator Functional Unit.

19. A multiprocessor memory sharing system according to claim 1 where at least a first FPGA Node Controllers are co-located with associated CPU's in a multi-chip package.

\* \* \* \* \*